United States Patent
Lupton et al.

(10) Patent No.: US 8,060,245 B2
(45) Date of Patent: Nov. 15, 2011

(54) HIGH VOLUME CONVEYOR SORTATION SYSTEM

(75) Inventors: Clinton R Lupton, Caledonia, MI (US); Phillip C Butler, Middleville, MI (US); Kenneth D Kane, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 880 days.

(21) Appl. No.: 11/567,777

(22) Filed: Dec. 7, 2006

(65) Prior Publication Data

US 2007/0129843 A1    Jun. 7, 2007

Related U.S. Application Data

(60) Provisional application No. 60/597,518, filed on Dec. 7, 2005.

(51) Int. Cl.
*G06F 7/00* (2006.01)
(52) U.S. Cl. ........................... 700/230
(58) Field of Classification Search .............. 700/230; 198/347.4, 419.5, 460.3, 462.1, 575, 577
See application file for complete search history.

(56) References Cited

U.S. PATENT DOCUMENTS

| | | | |
|---|---|---|---|
| 3,011,621 A | 12/1961 | Byrnes et al. | |
| 3,592,333 A | 7/1971 | Sullivan et al. | |
| 3,620,349 A | 11/1971 | McCombie | |
| 3,752,311 A | 8/1973 | Kobusch et al. | |
| 3,799,319 A | 3/1974 | Cutler et al. | |
| 3,880,298 A | 4/1975 | Habegger et al. | |
| 3,944,049 A | 3/1976 | Graybill | |
| 3,995,735 A | 12/1976 | Risley | |
| 4,383,605 A | 5/1983 | Harwick | |
| 5,191,967 A | 3/1993 | Woltjer et al. | |
| 5,267,638 A | 12/1993 | Doane | |
| 5,341,916 A * | 8/1994 | Doane et al. ............... | 198/460.1 |
| 5,358,097 A | 10/1994 | Bakkila et al. | |
| 5,411,131 A | 5/1995 | Haegele | |
| 5,638,938 A | 6/1997 | Lazzarotti et al. | |
| 5,732,814 A | 3/1998 | Owczarzak et al. | |
| 5,862,907 A | 1/1999 | Taylor | |
| 5,893,701 A | 4/1999 | Pruett | |
| 6,129,199 A | 10/2000 | Gretener et al. | |

(Continued)

FOREIGN PATENT DOCUMENTS

WO    99/41169 A1    8/1999

OTHER PUBLICATIONS

International Search Report (Form PCT/ISA/210) from corresponding Patent Cooperation Treaty Application No. PCT/US06/61719, dated Sep. 13, 2007.

(Continued)

*Primary Examiner* — Ramya Prakasam
(74) *Attorney, Agent, or Firm* — Gardner, Linn, Burkhart & Flory, LLP

(57) ABSTRACT

A sortation system and method of sorting product includes providing a sorter assembly and a supply system supplying product that is received by the sorter assembly. Product supplied to the sorter assembly is monitored and a parameter is determined that is indicative of the relationship between product supplied to the sorter assembly and product being sorted by the sorter assembly. The supply system is controlled as a function of a value of the parameter.

20 Claims, 19 Drawing Sheets

U.S. PATENT DOCUMENTS

| | | | |
|---|---|---|---|
| 6,131,372 A | 10/2000 | Pruett | |
| 6,378,687 B1 * | 4/2002 | Lem et al. | 198/349.95 |
| 6,513,641 B1 | 2/2003 | Affaticati et al. | |
| 6,540,063 B1 | 4/2003 | Fallas et al. | |
| 6,615,972 B2 | 9/2003 | Veit et al. | |
| 6,629,593 B2 | 10/2003 | Zeitler | |
| 6,638,062 B1 | 10/2003 | Davidson | |
| 6,715,598 B2 | 4/2004 | Affaticati et al. | |
| 6,881,916 B2 | 4/2005 | McLaughlin et al. | |
| 6,918,484 B2 | 7/2005 | Affaticati et al. | |
| 6,923,307 B2 | 8/2005 | Haan et al. | |
| 6,951,274 B2 | 10/2005 | Zeitler et al. | |
| 7,063,206 B2 | 6/2006 | Haan et al. | |
| 7,121,398 B2 | 10/2006 | Affaticati et al. | |
| 7,128,197 B2 * | 10/2006 | Haan et al. | 198/347.4 |
| 7,191,895 B2 | 3/2007 | Zeitler et al. | |
| 7,284,652 B2 | 10/2007 | Zeitler et al. | |
| 7,413,071 B2 | 8/2008 | Zeitler et al. | |
| 7,562,760 B2 | 7/2009 | Affaticati et al. | |
| 7,568,572 B2 | 8/2009 | Zeitler et al. | |
| 7,631,747 B2 | 12/2009 | Zeitler | |
| 2002/0063037 A1 * | 5/2002 | Bruun et al. | 198/370.01 |
| 2004/0065526 A1 | 4/2004 | Zeitler | |
| 2005/0217972 A1 * | 10/2005 | Haan et al. | 198/347.4 |
| 2009/0065330 A1 | 3/2009 | Lupton et al. | |

OTHER PUBLICATIONS

Written Opinion of the International Searching Authority (Form PCT/ISA/237) from corresponding Patent Cooperation Treaty Application No. PCT/US06/61719, dated Sep. 13, 2007.

* cited by examiner

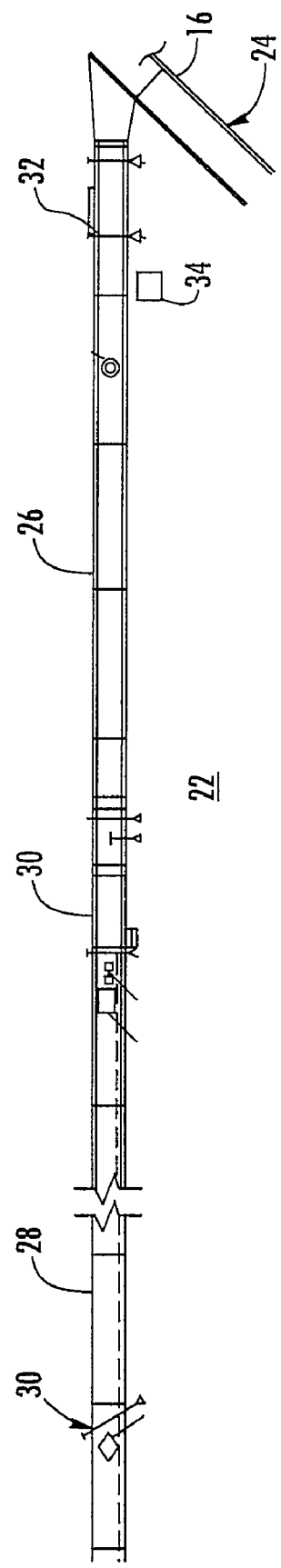

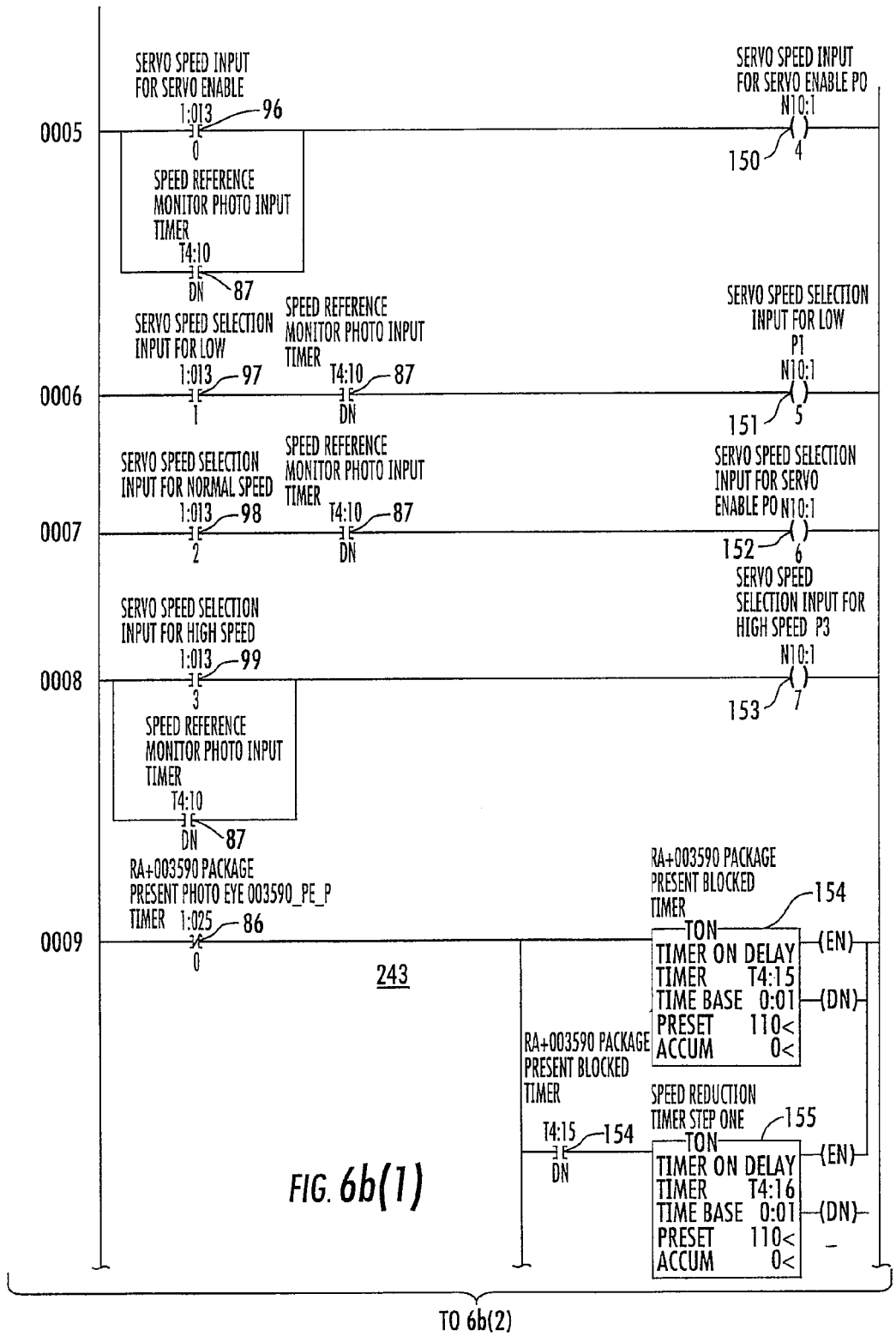
FIG. 6b(1)

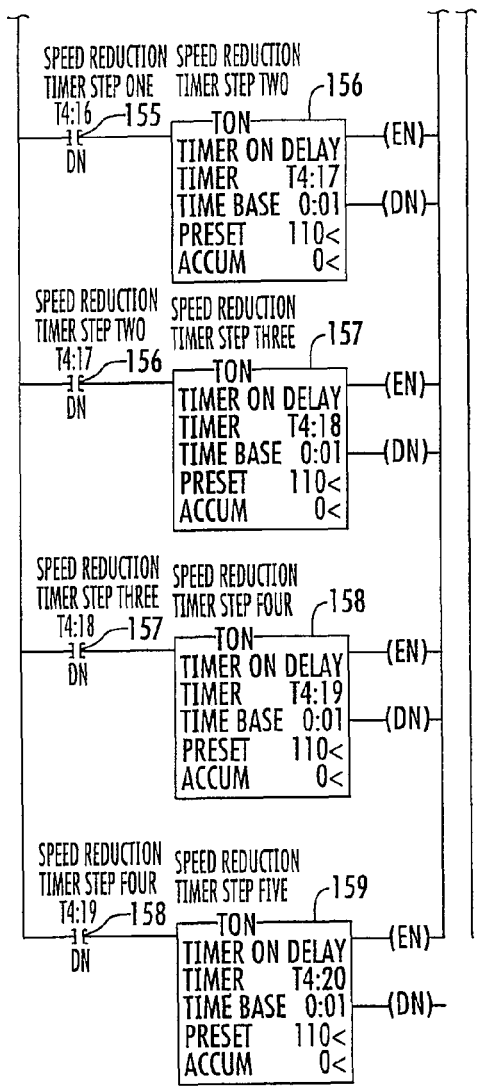
FIG. 6b(2)

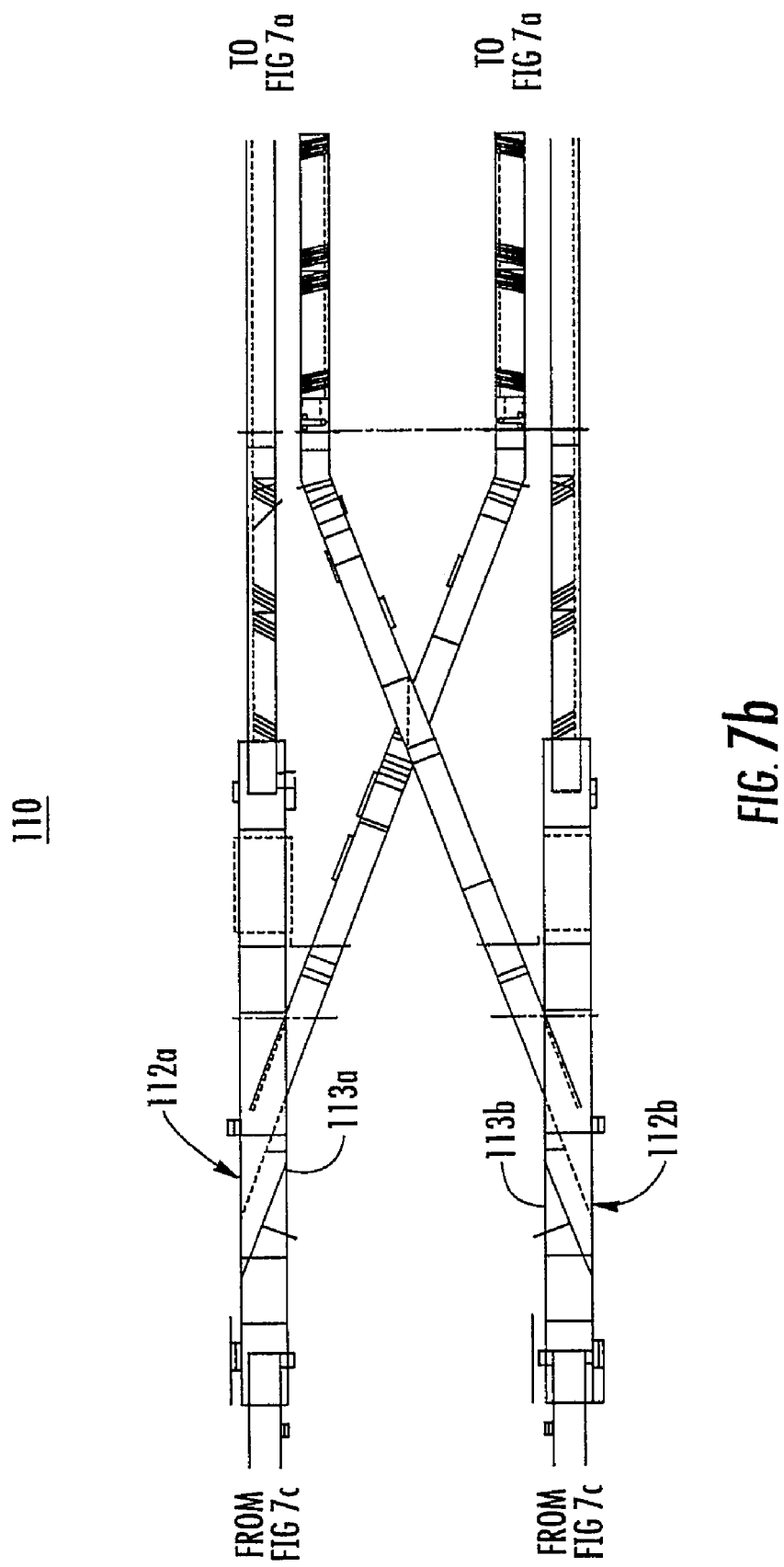

HIGH VOLUME CONVEYOR SORTATION SYSTEM

CROSS REFERENCE TO RELATED APPLICATION

This application claims priority from U.S. provisional patent application Ser No. 60/597,518, filed on Dec. 7, 2005, the disclosure of which is hereby incorporated herein by reference in its entirety.

BACKGROUND OF THE INVENTION

The present invention is directed to a sortation system and method and, in particular, to a sortation system and method in which product is supplied from a plurality of feed lines, such as accumulation lines or slug-building lines, and merged with a merge assembly.

In a material-handling system, it is common for product to be supplied from various sources and combined at a merge assembly. In such a system, the product may be accumulated upstream of the merge, such as in a plurality of slug-building lines in which the product is combined into slugs. An example of such a system is a system in which product is picked, manually or automatically, at multiple locations, each of which feeds a feed line. Alternatively, the product may be off-loaded from trucks at numerous docks and supplied to the feed lines.

The outputs of the feed lines are combined at a merge assembly and transported to a sortation assembly. The feed lines discharge product in a particular sequence to the merge assembly where they are combined and transported to the sorter assembly.

One difficulty with such material-handling system is that the performance curve of the sorter assembly and the performance curve of the merge assembly are typically different. Reference is made to FIG. 1. The merge assembly typically supplies fewer products than the sorter can sort with larger carton sizes and feeds more product than the sorter can sort with smaller carton sizes. While this would not typically be a problem if a unitary product size is handled by the material-handling system, most material-handling systems are required to handle a range of product sizes. As such, it is difficult to match the rate of the merge assembly with the rate of the sorter assembly resulting in either too much product or too few product being supplied to the sorter assembly at any particular time.

SUMMARY OF THE INVENTION

The present invention is directed to a method and apparatus for balancing the supply of product from a merge assembly to a sorter assembly at an optimal rate.

A sortation system and method, according to an aspect of the invention, includes providing a sorter assembly. The sorter assembly receives product and sorts that product to a plurality of sortation lines. A supply system is provided that is made up of a plurality of conveyors. The supply system supplies the product that is received by the sorter assembly. A control system is provided that monitors product received by the sorter assembly and determines a parameter. The parameter is indicative of a relationship of the product supplied to the sorter assembly and product being sorted by the sorter assembly. The control system controls the conveyors of the supply system as a function of the value of that parameter.

The control system may control the speed of the supply system as a function of the parameter. The sorter assembly may include an accumulator. The accumulator accumulates an excess of product supplied to the sorter assembly than product being sorted by the sorter assembly. The control system monitors product accumulated at the accumulator and determines the value of the parameter from the product accumulated at the accumulator. A plurality of product detectors may be spaced along the accumulator. The control system determines a value of the parameter as a function of which of the product detectors that are detecting product. The control system may control operation of the accumulator to accumulate product as a function of which of the detectors are detecting product. The control system may increase the value of the parameter in response to particular ones of the product sensors detecting product in a sequential order. The control system may decrease the value of the parameter in response to the particular ones of the product sensors not detecting product in a decreasing sequential order.

The sortation system may include at least one product detector at the accumulator and determine a value of the parameter as a function of an amount of time the at least one product detector is detecting product. The control system may increase the value of the parameter in response to an increase in the amount of time the at least one product detector is detecting product. The sortation system may include another accumulator that is downstream of the one accumulator. Such an arrangement is especially useful with a pre-sorter for performing an initial sort to direct product among two or more final sorters. With such arrangement, the control may monitor product accumulated at the another sorter and determine a value of the parameter as a function of the product accumulated at the another accumulator as well as a function of product accumulated at the one accumulator.

The sorter assembly may include a product induct. The product induct adjusts actual product gap between product being sorted by the sorter assembly. The control may determine a value of the parameter as a function of a speed of the product induct. The control system may determine a value of the parameter as a function of a difference between the actual product gap and an ideal product gap. The supply system may also include at least one product unscrambler. The product unscrambler organizes side-by-side product into a single file product. A sortation system, according to aspects of the invention, is capable of accommodating an increase in total product length leaving the unscrambler then entering the unscrambler.

The supply system may be made up of a plurality of supply accumulators, such as slug-building lines, and a merge assembly. Each of the supply accumulators may combine individual product into product slugs or may be traditional accumulators. The merge assembly receives product slugs from the supply accumulators and supplies the product from the supply accumulators to the sorter assembly. The control system may control a speed of the merge assembly as a function of the value of the parameter. A transport conveyor may convey product slugs from the merge assembly to the sorter assembly. The control system may control a speed of the transport conveyor assembly as a function of the value of the control parameter.

The control system may include a position transducer. The position transducer monitors movement of product slugs at the merge assembly. The control system may control discharge of product slugs from the slug-building lines as a function of an output of the position transducer.

The control system may control a speed of the conveyors between approximately 225 feet per minute and approximately 600 feet per minute as a function of the value of the parameter. The control system may control the speed of the conveyors in discrete increments, or continuously, as a function of the value of the parameter. The conveyors may be driven by variable frequency motors and/or servo-controlled motors. The control system may determine a value of the parameter from an algorithm and/or a look-up table.

A sortation system and method, according to another aspect of the invention, includes providing a sorter and an accumulator. The sorter receives product and sorts that product to a plurality of sortation lines. The accumulator accumulates an excess of product supplied to the sorter. A supply system is provided that is made up of a plurality of conveyors. The product is supplied to the accumulator with the supply system. Product accumulated with the accumulator is monitored and a rate of product supplied with the supply system is adjusted as a function of fullness of the accumulator with product.

These and other objects, advantages and features of this invention will become apparent upon review of the following specification in conjunction with the drawings.

BRIEF DESCRIPTION OF THE DRAWINGS

FIG. 3 is a detailed illustration of a slug-building line;

FIGS. 6a-6c is a programmable logic controller ladder diagram illustrating an alternative embodiment of a technique for determining induct speed, a fullness parameter and a conveyor speed of the supply system;

FIGS. 7a-7c is the same view as FIGS. 2a and 2b of an alternative embodiment thereof;

DESCRIPTION OF THE PREFERRED EMBODIMENT

Figure 1:
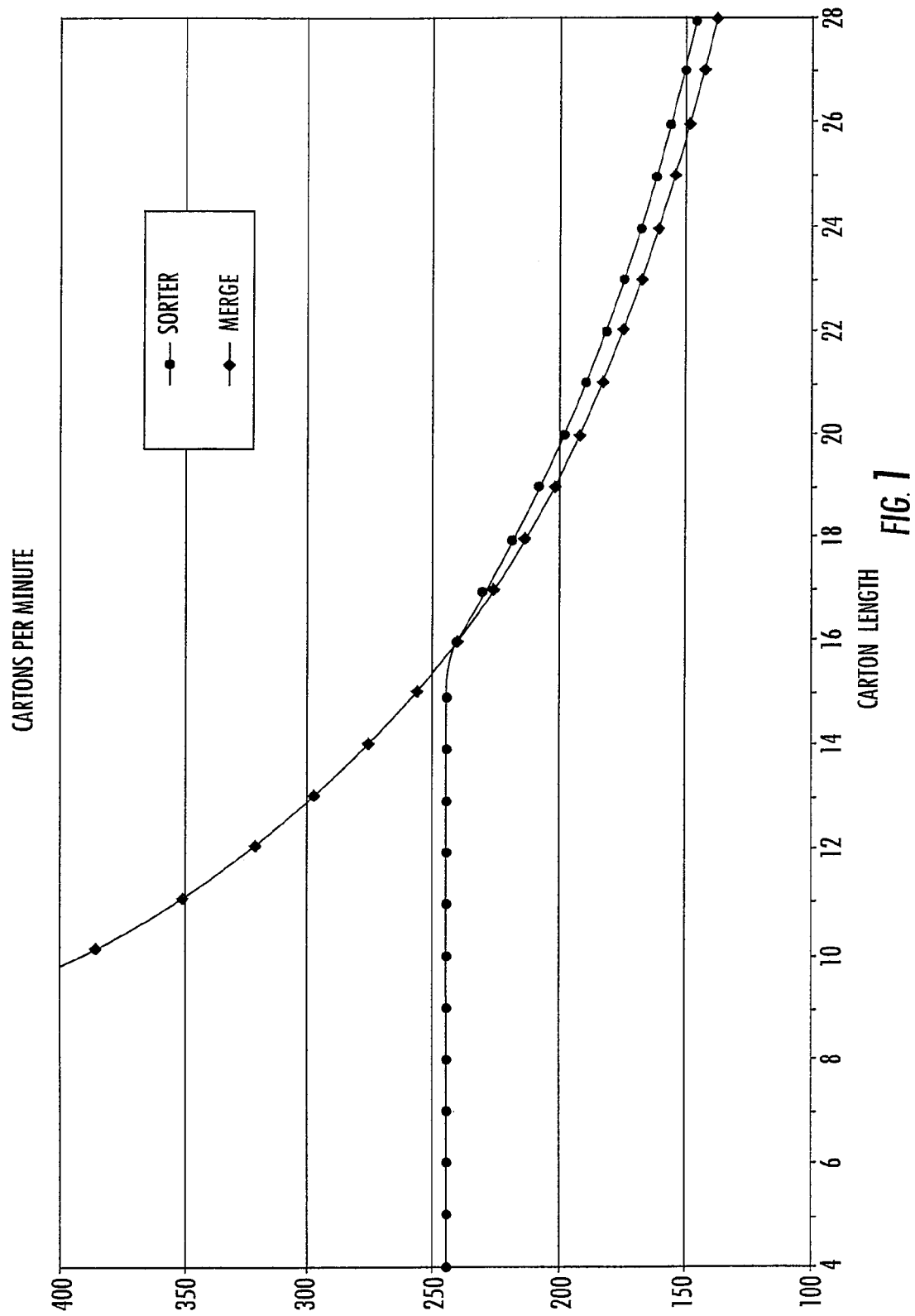
FIG. 1 is a diagram illustrating operating characteristics of a sorter assembly and a merge assembly as a function of article length.
Figure 2A:
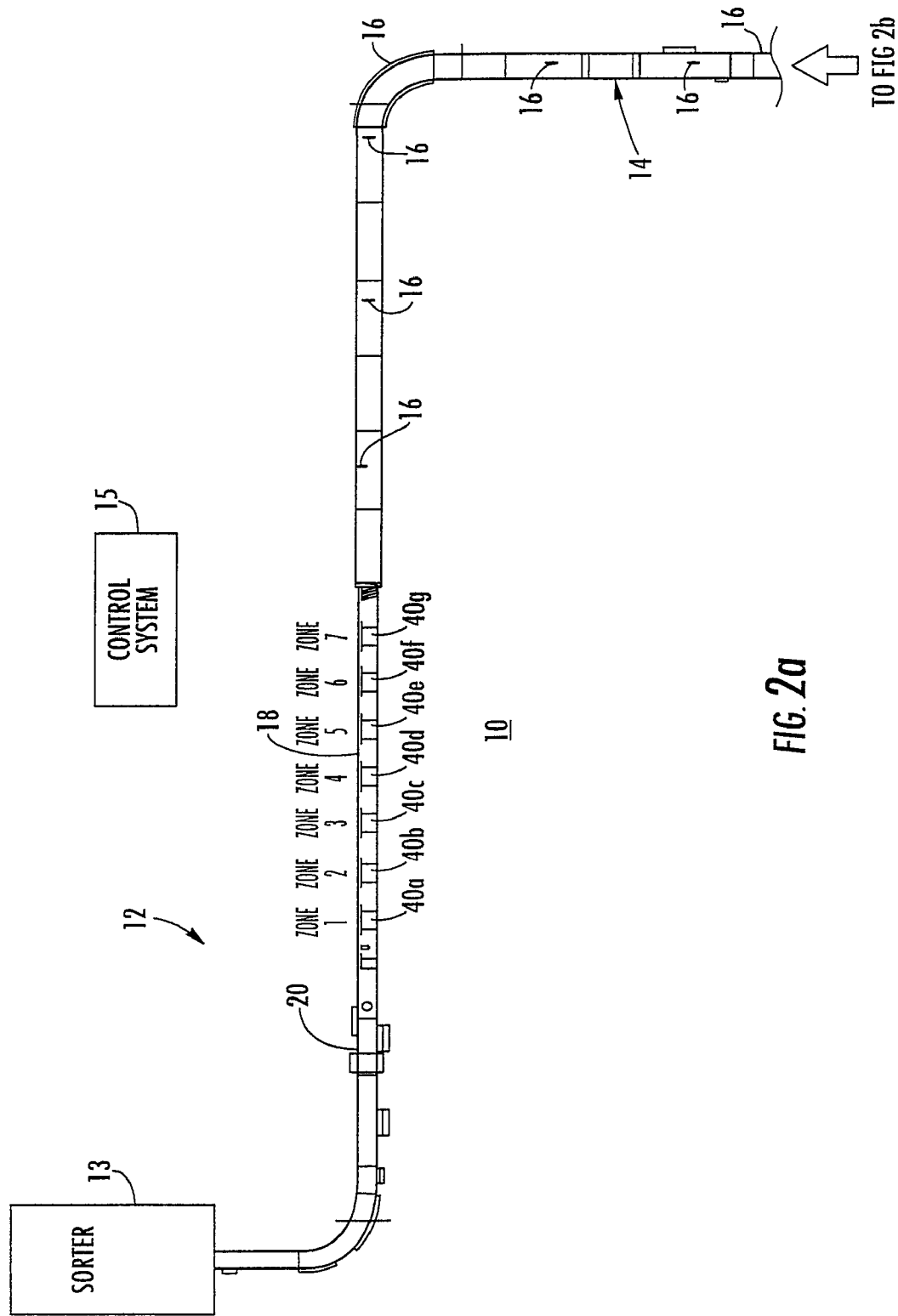
FIGS. 2a and 2b are a top plan view of a sortation system, according to the invention.
Figure 2B:
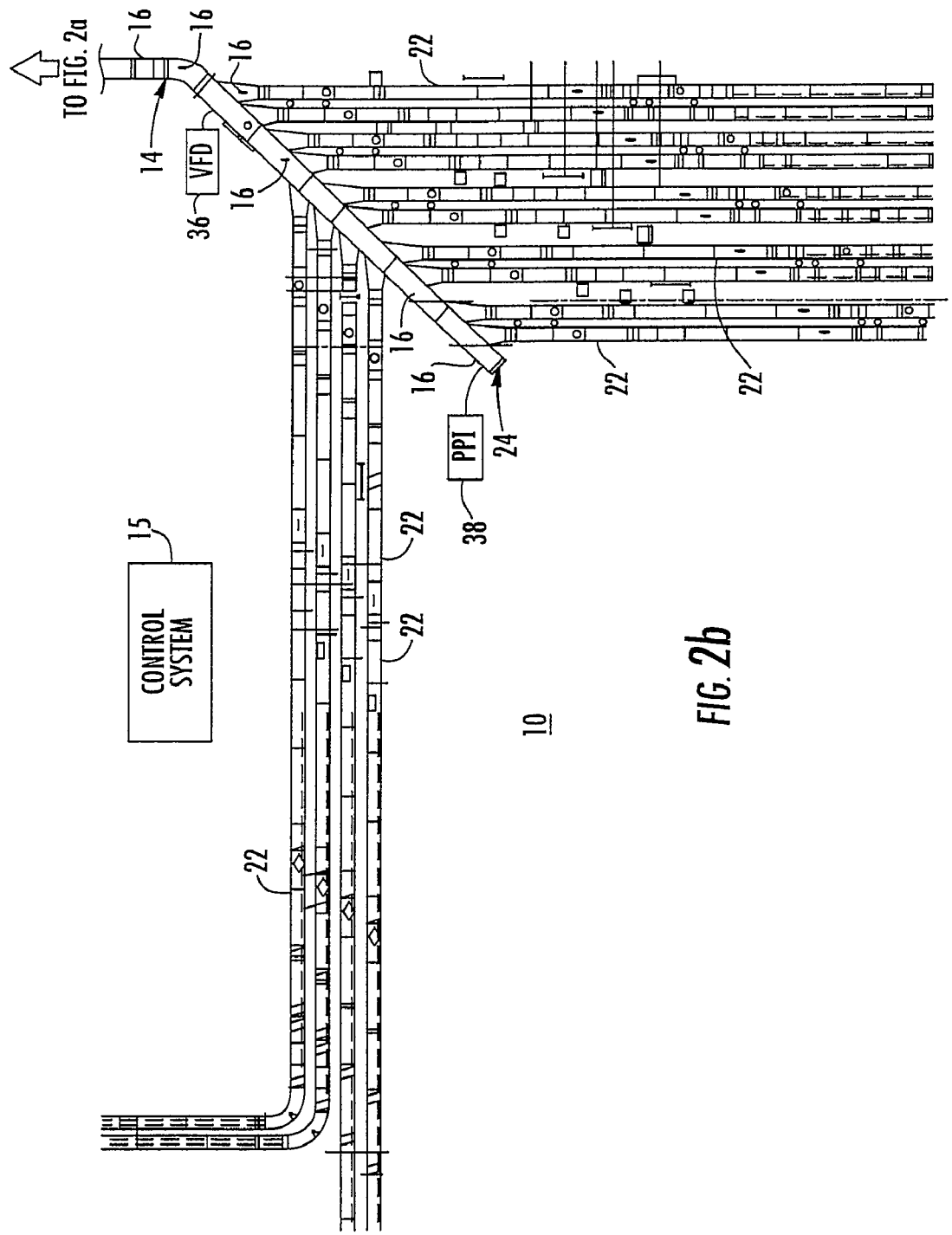
Figure 4:
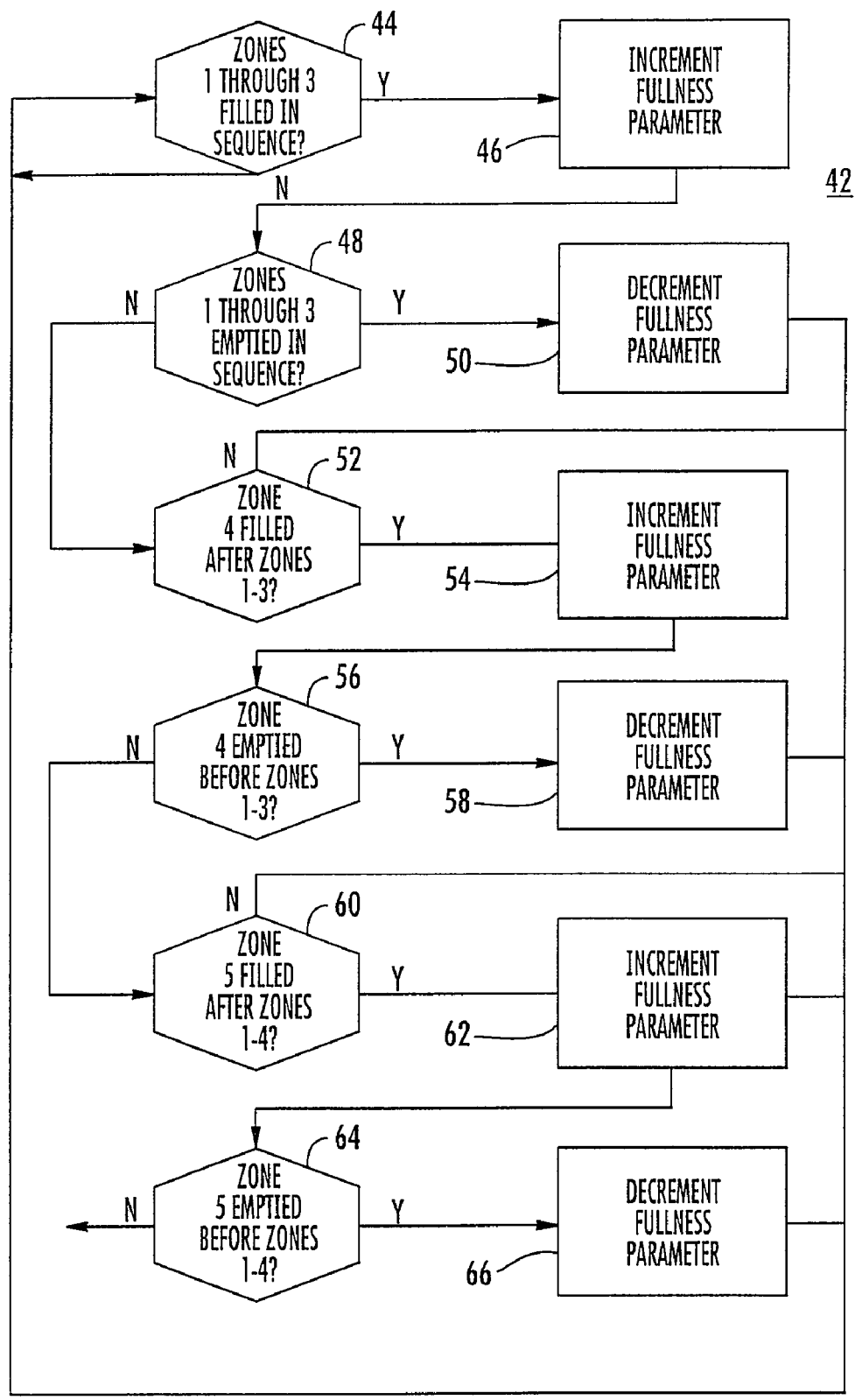
FIG. 4 is a flowchart illustrating the operation of a technique for determining a fullness parameter, according to the invention.

Referring now specifically to the drawings, and the illustrative embodiments depicted therein, a sortation system 10 includes a sorter assembly 12 and a supply system 14 (FIGS. 2a, 2b). Sortation system 10 further includes a control system 15 including a series of product monitors, such as photo-eyes, proximity sensors, sensing rollers, or the like, to monitor product on sortation system 10 and to control at least the supply system 14. Product may be individual items or may be boxes or other bundles of items. The product may come in a variety of lengths within a specified range of lengths. In the illustrative embodiment, sorter assembly 12 may include a sorter 13, such as a linear sorter of the type disclosed in commonly assigned U.S. Pat. Nos. 5,127,510; 5,165,515; 6,041,909; 6,814,216; 6,866,136; 6,860,383; and 6,923,308, the disclosures of which are hereby incorporated herein by reference. However, sorter 13 may be another type of linear sorter, such as a belt transfer, a pop-up wheel, steered wheel, stationary pusher, or the like. Also, sorter 13 may be a nonlinear sorter, such as a carousel sorter. Examples of carousel sorters are cross-belt sorters of the type disclosed in commonly assigned U.S. Pat. Nos. 5,588,520 and 6,478,138, the disclosures of which are hereby incorporated herein by reference, as well as tilt-tray sorters, and the like.

Sorter assembly 12 may include a gapping unit, or induct, 20 for supplying articles to sorter 13 with proper gaps between the articles. Induct 20 is illustrated in one embodiment as a single-line induct, such as the type disclosed in commonly assigned U.S. Pat. Nos. 5,341,916; 6,513,641; 6,629,593; 6,715,598; and 6,918,484, the disclosures of which are hereby incorporated herein by reference. Other known gap optimizers or single-line, inducts may also be used. However, induct 20 is illustrated in another embodiment as a multiple-line induct of the type disclosed in commonly assigned U.S. Pat. Nos. 5,038,918 and 5,267,638, the disclosures of which are hereby incorporated herein by reference. In the case of a multiple-line induct, the supply system 14 would be provided to feed each of the lines of the induct, as will be discussed in more detail below. Sorter assembly 12 may further include an accumulator 18 for accumulating excess product supplied to sorter 13 at a rate faster than product can be sorted by sorter 13.

Supply system 14 is made up of a plurality of conveyors 16. Supply system 14 additionally includes a plurality of feed lines, such as supply accumulators, or slug-building lines 22, and a merge assembly 24 for receiving outputs of the feed lines 22 in a controllable fashion under the guidance of the control system 15. In particular, in the illustrative embodiment, feed lines 22 each accumulate a slug of product that are closely spaced and may be touching each other. Control system 15 selectively discharges product from one of lines 22 at a time and does not discharge another line until the product from one line has had a chance to pass far enough through merge 24 to avoid interference.

Details of an exemplary feed line 22 are illustrated in FIG. 3. Feed line 22 includes a slug belt 26 for accumulating a series of product into a slug. Feed line 22 additionally includes an accumulator 28 and a brake belt 30 between accumulator 28 and slug belt 26. Alternatively, product may be supplied directly from accumulators 28 to the merge assembly. Product is received and accumulated with accumulator 28 as received from an upstream process. The upstream process may be, by way of example, a pick operation in which individual orders are picked either manually or by machine in order to fill individual orders which arrive in the form of one or more articles, such as boxes, containers, or the like. Alternatively, the upstream process may be an inbound truck dock in which articles are off-loaded from a plurality of trucks for subsequent sorting by sorter 13. However, it should be understood that the upstream process does not form any part of the invention.

While product is being accumulated on a line 22, brake belt 30 is stopped to hold back the accumulated product. Stops, or the like, may also be used. When a number of articles are accumulated on accumulator 28, as determined by one or more article detectors, such as photo-detectors 30, accumulator 28 is actuated to discharge articles as a slug. Concurrently, brake belt 30 is actuated in order to transfer the accumulated articles to slug belt 26. The articles are accumulated on slug belt 26 by operating slug belt 26 at the same or similar speed to brake belt 30. This process of accumulating product on accumulator 28 and transferring product with brake belt 30 to slug belt 26 continues until a slug is built on slug belt 26 as determined by one or more article detectors, such as photo-detectors 32. Operation of slug-building line 22 may, alternatively, utilize the principles disclosed in commonly assigned U.S. Pat. Nos. 6,923,307 B2 and 7,128,197, the disclosures of which are hereby incorporated herein by reference. However, for reasons that will be set forth below, it is not necessary that slug-building line 22 incorporate a power feed conveyor between brake belt 24 and slug belt 26 because, in the illustrative embodiment, it is not necessary to separate the articles because it is not necessary to measure the lengths of the articles as provided in certain embodiments of the '307 patent. In particular, in the illustrative embodiment, uniform length slugs are built on slug belt 26. However, it is possible to control sortation system 10 in the manner that variable length slugs are built on slug belts 26. Slug-building line 22 additionally includes a variable speed drive, such as a variable frequency drive 34, a servo drive, or the like. As will be discussed in detail below, slug belt 26 discharges articles at the same speed, or related speed, as conveyors 16 which may vary from moment to moment. Also, it is possible to build slugs on slug belt 26 at one speed and discharge slugs at a higher speed.

Each of conveyors 16 includes a conveying surface that is driven at a variable speed by control system 15. This may be accomplished by providing a variable frequency drive 36 for each conveyor 16, a servo-motor drive for each conveyor 16, or the like. Control 15 may control the speed of conveyors 16 in unison in a manner that will be described in more detail below. One or more conveyors 16 are capable of monitoring product movement on the conveying surface. This may be accomplished by a pulse position indicator (PPI) 38. PPI 38 monitors movement of the conveying surface of conveyor 16 to which it is attached. Control system 15 monitors PPI 38 in order to determine the distance that the conveying surfaces of conveyors 16 of merge 24 have traveled since the last slug was discharged from one of the slug-building lines 22. By having information on the length of the discharged slug and the distance that the conveying surfaces of conveyors 16 have traveled since the last slug was discharged, control system 15 is able to determine when to discharge a slug from another slug-building line 22. Also, by monitoring movement of conveyor 16, PPI 38 allows control system 15 to determine a speed of the conveying surfaces of conveyors 16. Control system 15 can then, in turn, control a discharge speed of slug belt 26 to coordinate with the speed of conveyors 16. In embodiments not including a slug belt, the discharge speed of a supply accumulator can be controlled by controlling the speed of brake belt 30. Pulse position indicators are well known in the art and are available from multiple sources. While the invention is illustrated with the use of PPI 38, it should be understood that other control techniques may be utilized to monitor movement of slugs through merge 24, such as timers, article detectors, or the like. Also, the speed of discharge of slug belt 26 may be controlled by control system 15 utilizing data within the control system that determines the speed of conveyor 16. Other modifications will become apparent to the skilled artisan. In the illustrated embodiment, conveyors 16 between merge 24 and accumulator 18 are operated at a slightly higher speed than conveyors 16 of the merge and accumulator 18 operates at a slightly higher speed than conveyors 16. In the illustrated embodiments, conveyors 16 include belt conveying surfaces, such as of the type disclosed in commonly assigned U.S. Pat. Nos. 6,811,018 and 7,093,709 for a BELT CONVEYOR, the disclosures of which are hereby incorporated herein by reference.

Means are provided for monitoring the fullness condition of sorter assembly 12. The fullness condition is the relationship of product supplied to sorter assembly 12 over the product being sorted by sorter 13. If excess of product is being supplied, the excess may be accumulated by accumulator 18. The fullness condition of sorter assembly 12 may be determined by measuring the accumulation of articles on accumulator 18 and may be used to develop a fullness parameter by control system 15. In the illustrative embodiment, accumulation of articles on accumulator 18 may be monitored by one or more article sensors 40 spaced along the accumulator. In the illustrative embodiment, article sensors 40 are the same sensors that are used to operate accumulator 18 in order to accumulate the product. However, separate article sensors 40 may be utilized. Use of article sensors 40 to control accumulator 18 is well known in the art such as disclosed in commonly assigned U.S. Pat. Nos. 5,191,967; 5,358,097; 5,429,225; 5,540,323; and 6,811,018 B2; Patent Application Publication Nos. US 2004/0112713 A1 and US 2003/0192769 A1; and pending patent application Ser. No. 11/420,248, filed May 25, 2006, by German et al. entitled AIRLESS ACCUMULATION CONVEYOR, the disclosures of which are hereby collectively incorporated herein by reference. Accumulator 18 may be a roller accumulator, a belt accumulator, a pneumatically actuated accumulator, an all-electric accumulator, or the like.

For convenience, the zones are labeled zone 1 through zone 7 beginning with a downstream end of accumulator 18 as established by article flow. It should be understood that reference to increases or decreases in a parameter is relative and could, alternatively, be expressed in the converse. Any parameter definition is for illustration purposes only. In order to establish a value of the fullness parameter of accumulator 18, control system 15 utilizes a technique 42. Control technique 42 examines at 44 whether zones 1-3 are filled in sequence. If so, it is determined that accumulator 18 has accumulated articles and the fullness parameter is incremented at 46. Control system 13 responds to the fullness parameter being incremented by reducing the speed of conveyors 16 by a particular amount, such as by five percent. It is then determined at 48 whether zones 1-3 are emptied in sequence. If so, the fullness parameter is decremented at 48. Control 15 responds to this decrease in the fullness of accumulator 18 by increasing the speed of conveyor 16 by a particular amount, such as five percent.

If it is determined at 48 that zones 1-3 have not emptied in sequence, it is determined at 52 whether zone 4 has filled after zones 1-3. If so, the fullness parameter is further increased at 54. This further increase in the fullness parameter causes control system 15 to further reduce the speed of conveyor 16, such as by a total of 10 percent. It is then determined at 56 whether zone 4 has emptied before zones 1-3. If so, the fullness parameter is decremented at 58 and control system 15 increases the speed of conveyors 16. With conveyors 16 previously reduced in speed by 10 percent from nominal, control 15 increases the speed from a 10 percent reduction to a five percent reduction. If it is determined at 56 that zone 4 has not emptied before zones 1-3, it is determined at 60 whether zone 5 has filled after zones 1-4. If so, the fullness parameter is further incremented at 62 and the speed of conveyors 16 further reduced, such as 20 percent less than nominal. It is then determined at 64 whether zone 5 has emptied before zones 1-4. If so, the fullness parameter is decremented at 66 such as from 20 percent to 10 percent below nominal speed. While only illustrated for five zones, the same sequence can be applied to all zones.

Figure 5A:
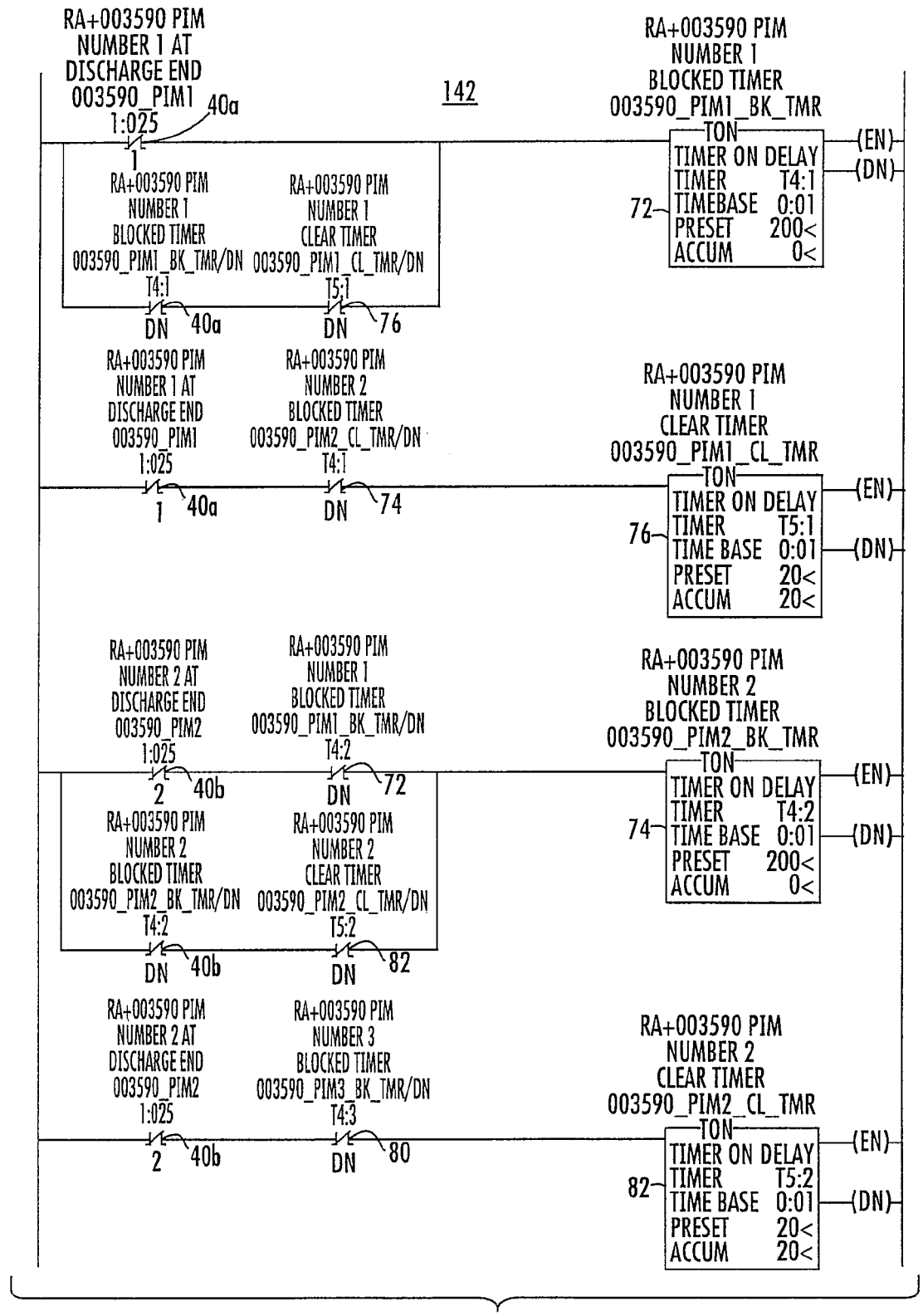
FIG. 5 is a programmable logic controller ladder diagram illustrating a detailed embodiment of the control technique of FIG. 4.
Figure 5B:
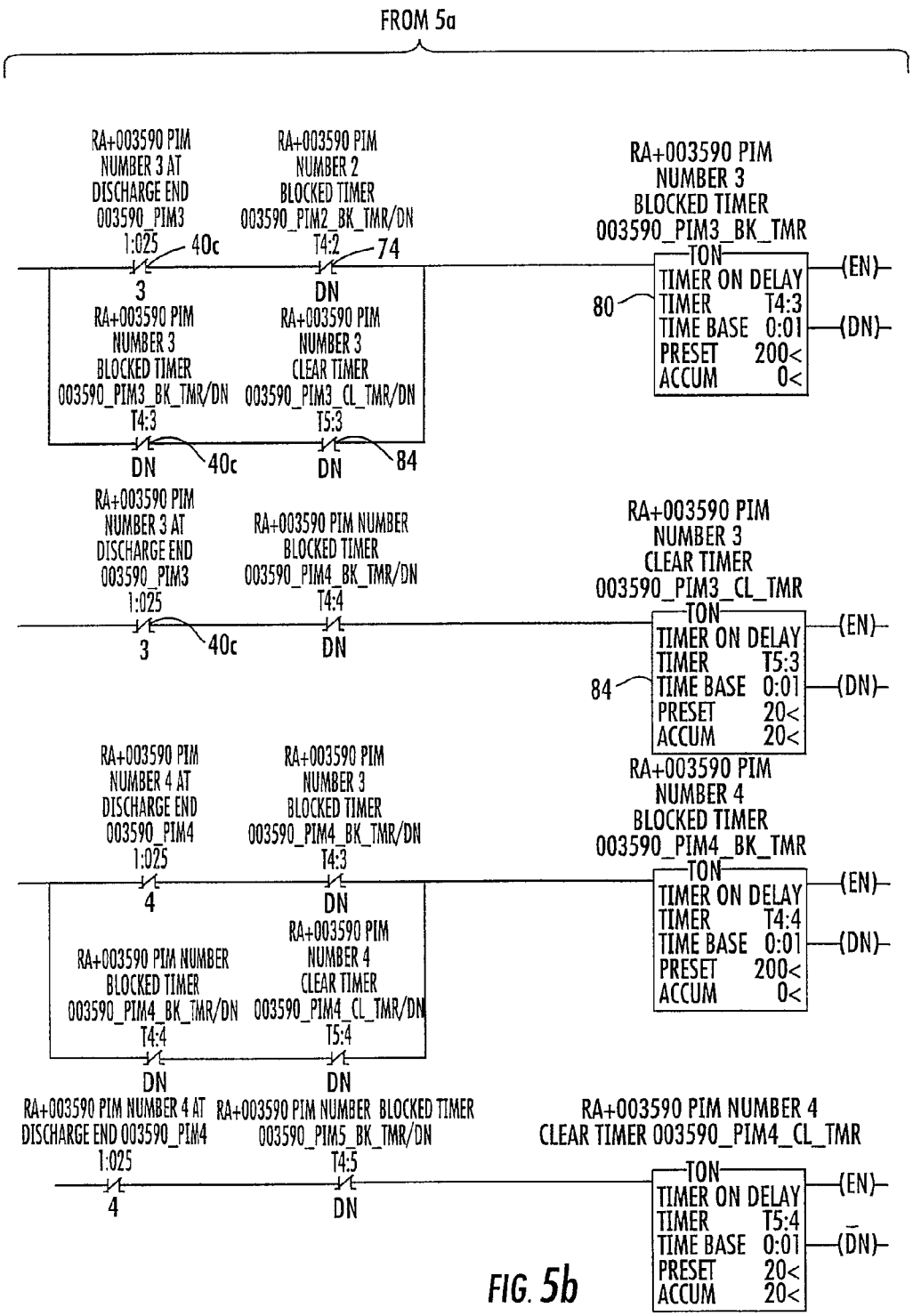

A detailed embodiment control sequence 142 is illustrated in ladder diagram form in FIG. 5. The sensing of an article by the first or most-downstream product sensor 40a initiates a first timer 72 and the timer runs. When timer 72 is done, the zone is considered full and the timer remains done until the zone clear timer 76 is done. If first product sensor 40a programmable logic controller no longer senses an article and if a second timer 74 for the adjacent upstream zone has not timed out, the first timer is cleared at 76. When clear timer 76 is done, the first zone is considered empty and timer 72 is reset. Once first timer 72 is initiated, it will be held in that state by a parallel logic connection of the non-sensing state of first article sensor 40a and the not-reset state of clear function 76.

Second timer 74 is initiated if a second product sensor 40b senses an article provided that first timer 72 for the adjacent downstream zone is done timing. When timer 74 is done timing, zone 2 is considered full to that level and timer 74 remains done until the zone clear timer 82 is done. If second product sensor 40b no longer senses an article and the adjacent upstream timer 80 is not done timing, second timer 82 is cleared at 82.

This same logical sequence is carried upstream for a continuous chain of product sensors. The discharge zone (zone 1) always considers the downstream zone timer to be done timing. The charge zone (zone 7) always considers the upstream adjacent zone blocked timer not done. Control sequence 142 determines that the article detectors 40a-40g are blocked or open in sequential order to increase or decrease the fullness parameter. The states of the zone timers 72, 74, 80, and the like, are applied to a lookup table, or are used as parameters in an algorithm, in order to obtain a value of the fullness parameter of accumulator 18.

Figure 6A:
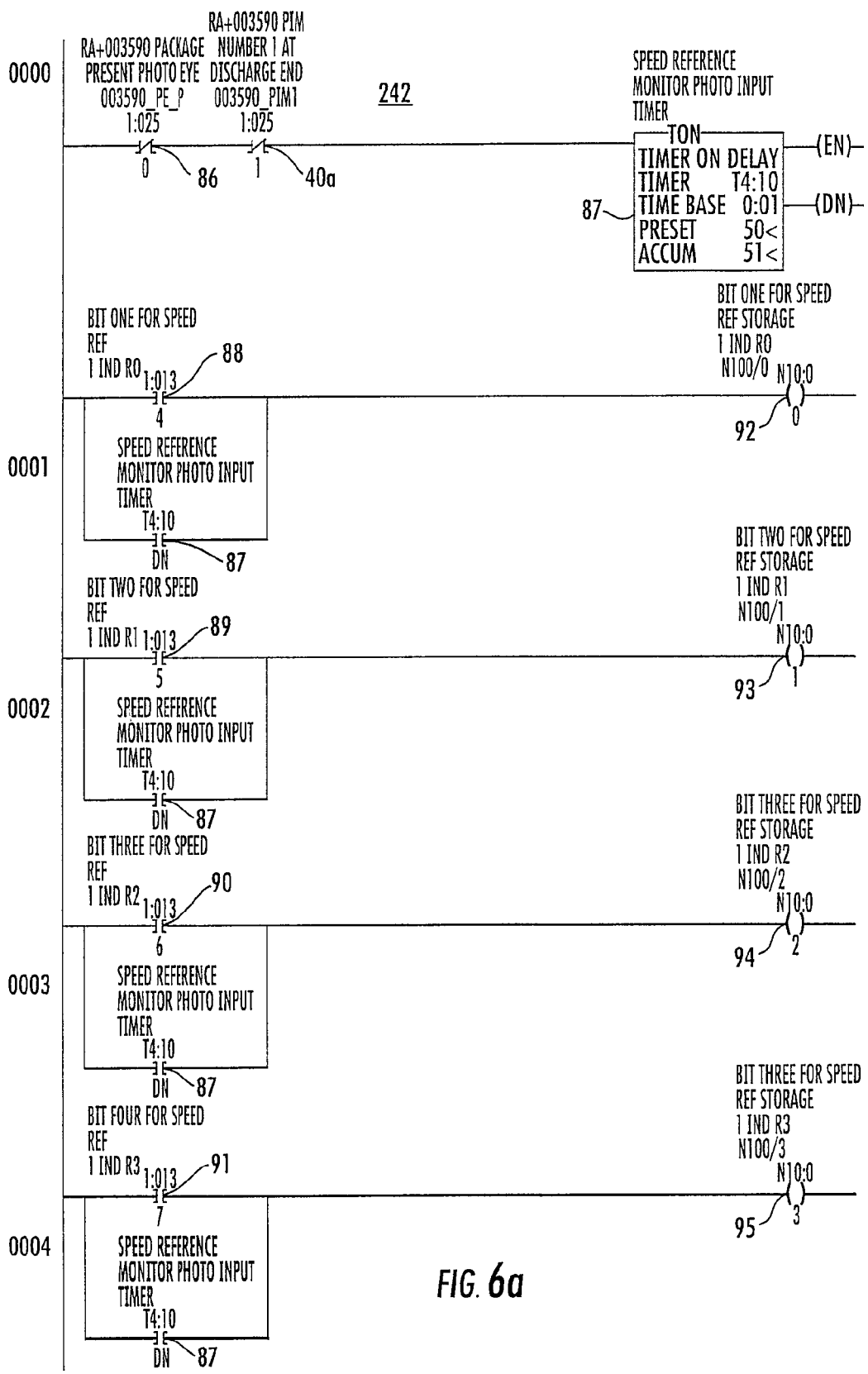
Figure 6C:
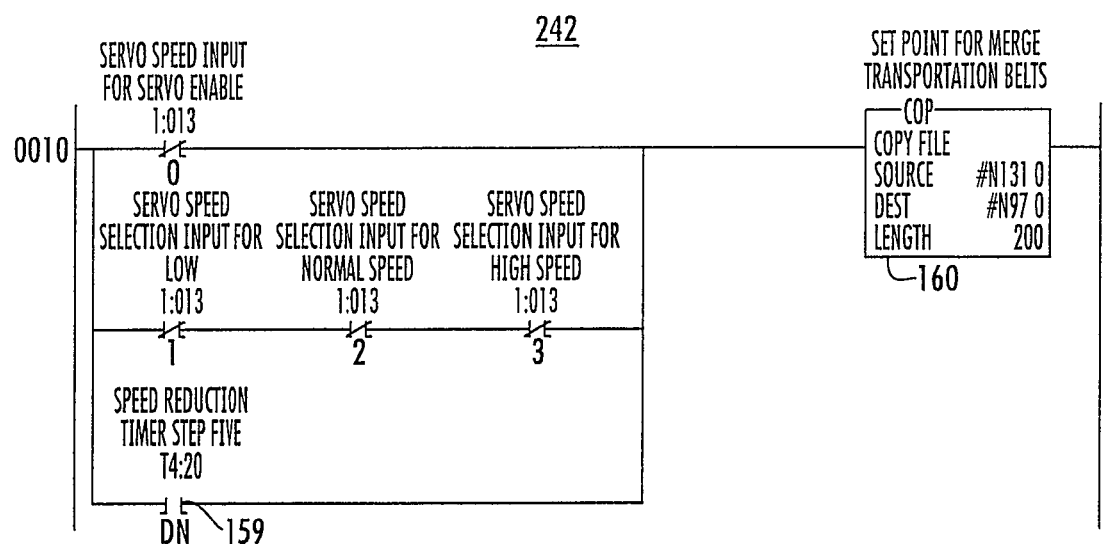
Figure 7A:
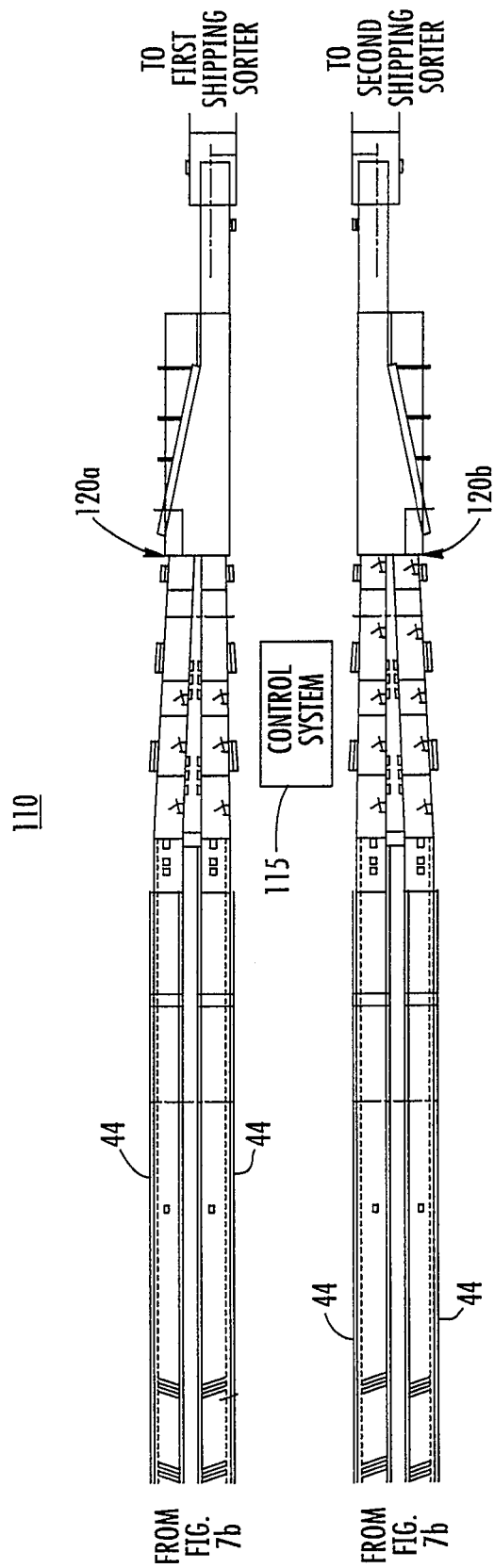
Figure 7C:
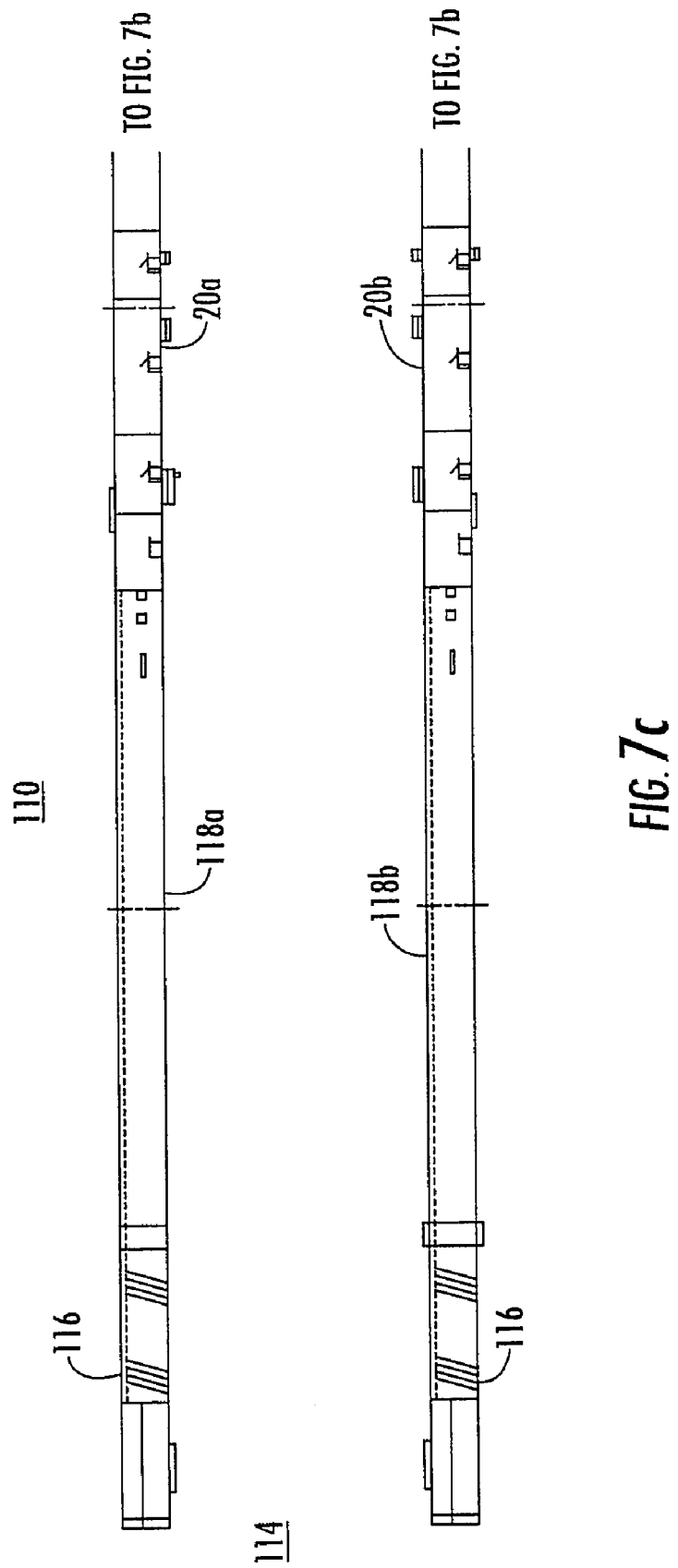
Figure 8A:
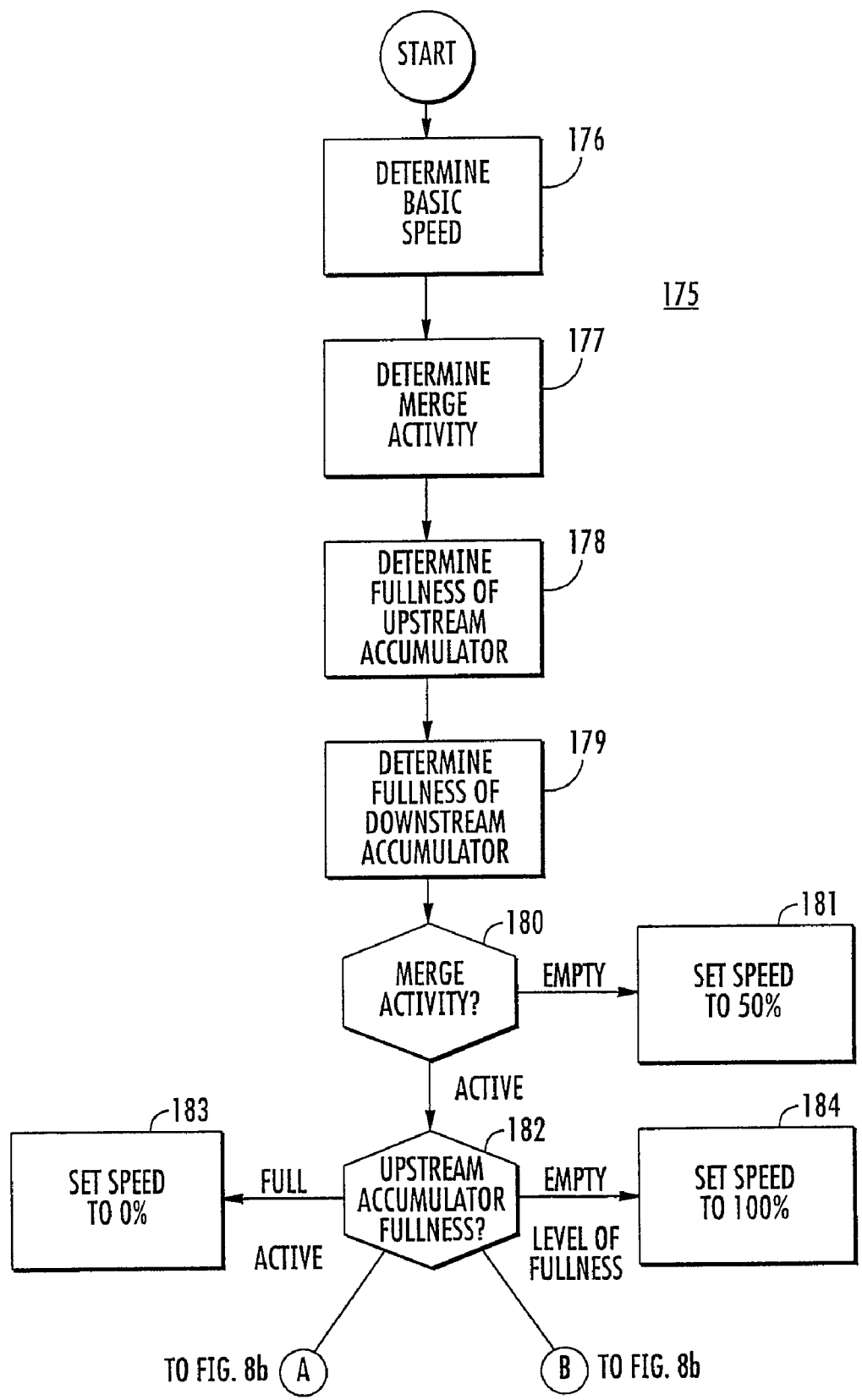
FIGS. 8a-8b is a flowchart illustrating a control program for control of a sortation system.
Figure 8B:
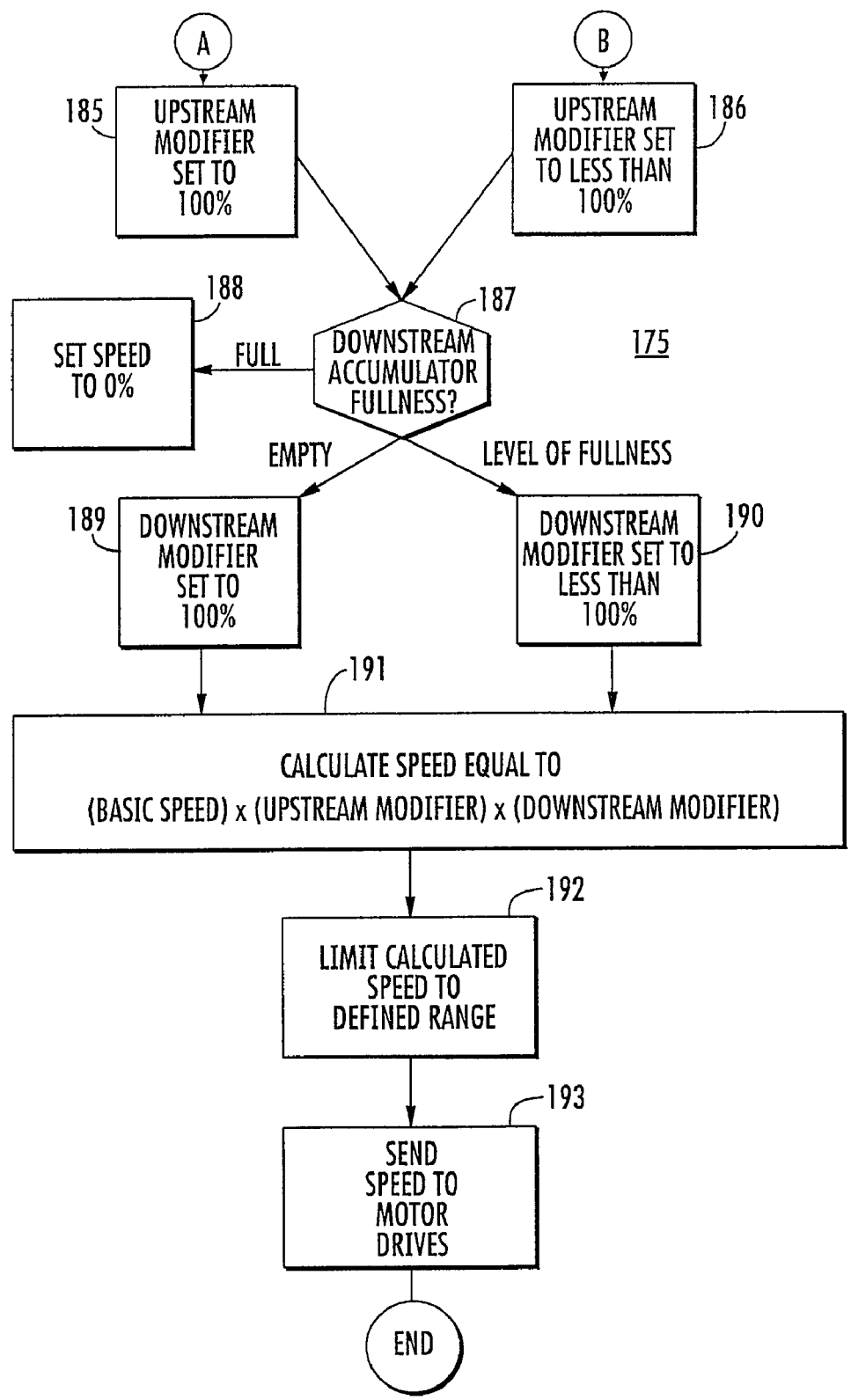
Figure 9A:
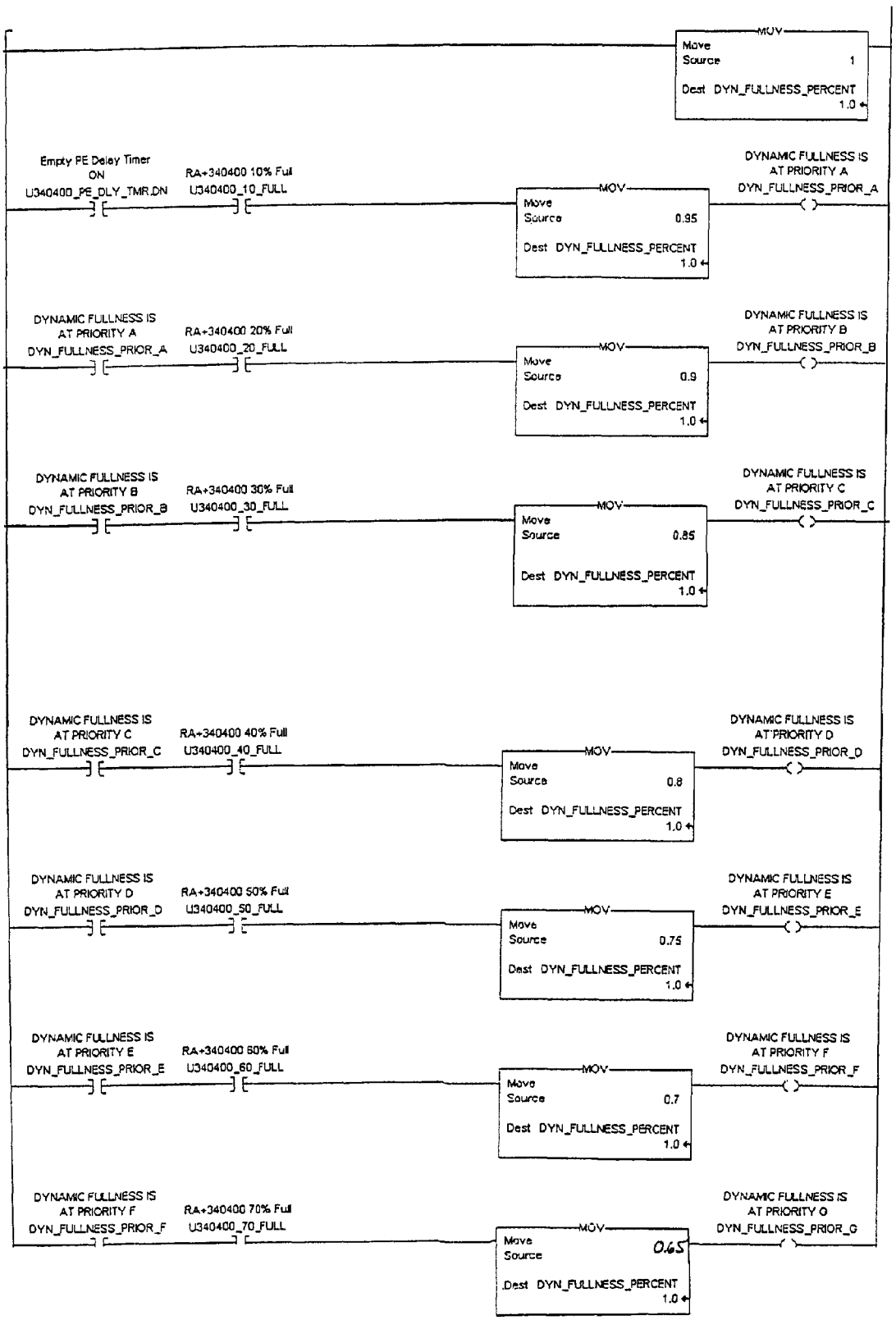
FIGS. 9a-9c is the same view as FIGS. 6a-6c illustrating an alternative embodiment of a technique for determining a fullness parameter, induct speed based on sorter speed and conveyor speed of the supply system.
Figure 9B:
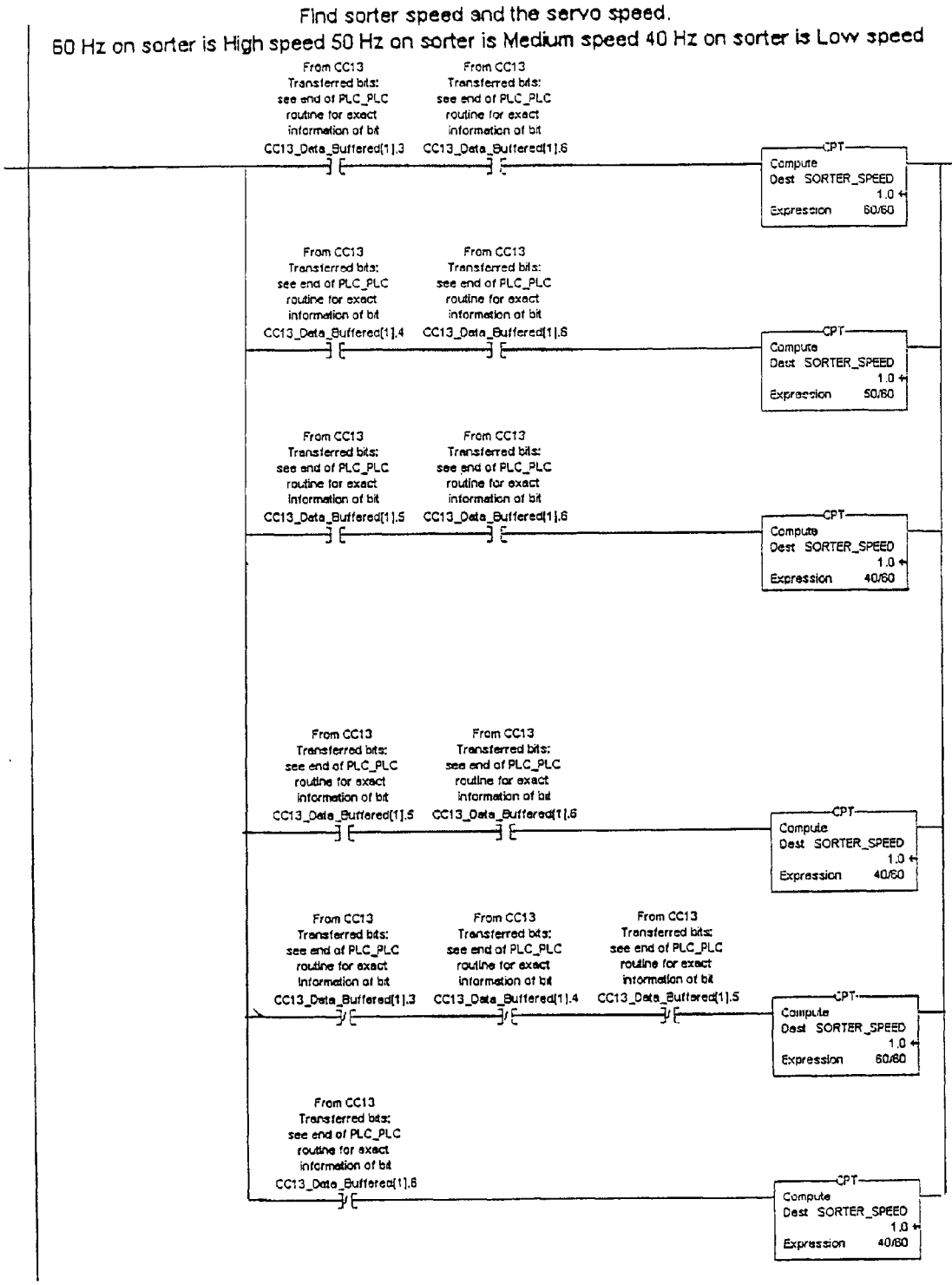
Figure 9C:
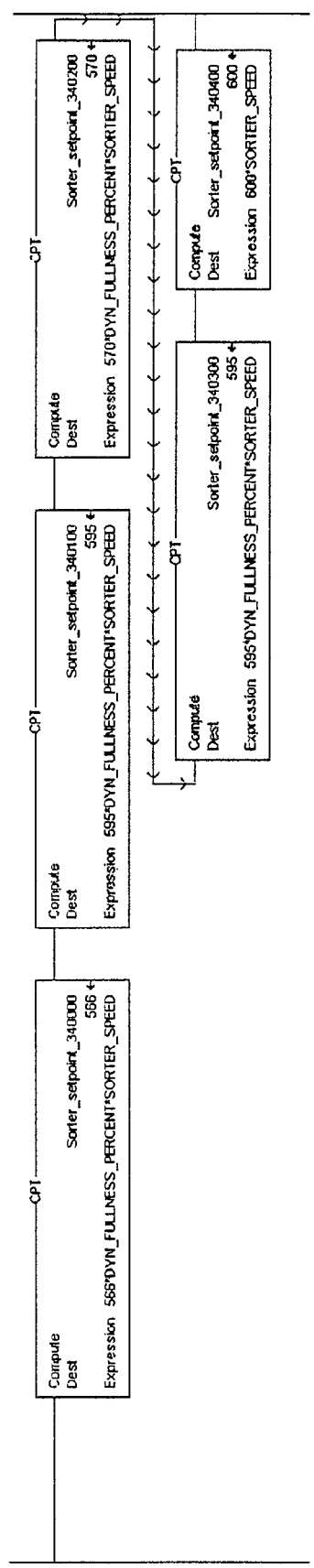

In the illustrative embodiment, the speed parameter established by control system 15 is a function of the speed of the conveying belts defining induct 20. As is understood by the skilled artisan and as disclosed in, for example, commonly assigned U.S. Pat. Nos. 5,038,918; 5,341,916; and 5,267,638, induct 20 controls gaps between product by one or more servo-operated conveying belts. The speeds of such conveying belt(s) is set by providing numerical commands to servo-controllers from an induct controller (not shown). Sortation system 10 utilizes such numeric values in order to determine the speed of the conveyor belt(s) of induct 20 and utilizes a speed value for induct 20 as a baseline for using the fullness parameter established by control system 15. The fullness parameter may be indexed to reduce the speed of supply system 14 below that of induct 20 as accumulator 18 becomes full through the accumulation of product. The manner in which the speed of induct 20 is processed is illustrated in FIGS. 6a and 6b. Alternatively, the fullness parameter may be a function of the gap error detected at the induct. The gap error is the difference between the actual gap between product and an ideal gap between product. As the gap error increases, it is concluded that the sortation system is starved of product so the fullness parameter is low and the speeds of the conveying surfaces of conveyors 16 are increased. If the gap error decreases, it is concluded that the sortation system is being fed an excess of product. The fullness parameter increases and the speeds of the conveying surfaces of conveyors 16 decrease.

A control sequence 242 utilizes two speed commands that are provided to the servos of induct 20. The two speed commands are the speed of the most-downstream conveyor, known as the "master belt," which may be commanded between high speed, medium speed, low speed and stop speed. The second command is selected from amount 15 ratios of speeds between the master belt and an upstream slave belt. Another belt upstream of the slave belt is driven at a speed that is a fixed ratio to the speed of the slave belt. The speed of the most-upstream belt is considered to be the speed of induct 20.

Control sequence 242 includes four inputs 88-90 which represent the four bits of the speed command and which have respective outputs 92-95. Inputs 96-99 which represent the four bits of the feed ratio values of the induct 20 and have respective outputs 150-153. Outputs 92-95 and 150-153 are applied to a lookup table in order to determine an initial value applied to a drive register for a base speed of conveyors 16 of supply system 14. A subtraction is made from this base speed as a function of the fullness parameter of the accumulator, such as is determined by control sequence 242. The result is a speed command sent to the variable frequency drives of conveyors 16 in order to control their respective speeds based upon the speed of induct 20 and the fullness of accumulator 18.

A package-present article detector 86 detects the presence of articles between accumulator 18 and induct 20. If article sensor 86 and the most-downstream article sensor 40a of accumulator 18 do not sense the presence of product, an output timer 87 forces outputs 92-95 to a full speed state. Likewise, the absence of any product sensed by sensors 86 and 40a causes outputs 150-153 to be at a maximum ratio. The net effect is to consider the speed of induct 20 to an artificial maximum level should there be no product present at the downstream end of accumulator 18 or at the conveyor between accumulator 18 and induct 20.

An alternative control technique for determining an accumulator fullness parameter 243 utilizes a single sentinel article sensor, namely, article sensor 86 between the output of accumulator 18 and the input of induct 20. If article sensor 86 senses articles, then a series of timers 154-159 may be actuated. The timers are arranged in sequential fashion such that, for example, when timer 154 times out, timer 155 begins timing. When timer 155 times out, timer 156 begins timing, and the like. The outputs of timers 154-159 are applied to a lookup table in order to determine an accumulator fullness parameter. In operation, fullness determining technique 243 is based upon the fact that gaps should be detected by article sensor 86 as long as supply system 14 is not overfeeding sorter assembly 12. The sensing of gaps will prevent timers 154-159 from timing out. Should articles begin to accumulate on accumulator 18, article sensor 86 may not sense any gaps thereby allowing one or more of timers 154-159 to timeout thereby indicating at least a partial fullness condition. In the illustrative embodiment, each timer 154-159 is set to 1.1 seconds. Thus, if a gap is not sensed by article sensor 186 for five seconds, accumulator 18 is deemed to be full and supply system 14 will experience a maximum reduction in speed. If the sentinel article sensor senses a gap between product, the fullness level immediately decreases to empty. Function 160 represents a set speed for conveyors 116 based on the speed of the inducts and the fullness parameter. While sentinel article sensor 86 is illustrated close to the sorter assembly, it could be positioned elsewhere in the system, such as at supply system 14.

The present invention can be applied to sortation systems of various configurations. In an alternative embodiment, a sortation system 110 includes a pair of sorter assemblies 112a and 112b. Sorter assemblies 112a, 112b include respective pre-sorters 113a, 113b, accumulators 118a, 118b and inducts 20a, 20b supplying product to the respective pre-sorters. Sorter assemblies 112a, 112b are supplied with product from a supply system 114 having conveyors 116 and one or more merge assemblies (not shown). The purpose of pre-sorters 113a, 113b is in order to provide an initial sortation of product to one of two shipping sorters (not shown). Each shipping sorter may be supplied product from a dual-line induct 120a, 120b. A downstream buffer 44 may be provided between an output of a pre-sorter 113a, 113b and input to respective induct 120a, 120b. Downstream accumulators 44 are capable of accumulating product being supplied to the respective shipping sorters by way of respective inducts 120a, 120b. In the illustrative embodiment, control system 115 monitors not only the fullness state of accumulators 118a, 118b, but also the fullness state of downstream accumulators 44. Speed commands provided to conveyors 116 of supply system 114 are a function of the speeds of inducts 120a, 120b, the fullness condition of accumulators 118a, 118b and the fullness condition of downstream accumulators 44. Other variations of a sortation system to which the present invention may be applied would be apparent to the skilled artisan.

A control program 175 for control of sortation system 110 determines at 176 a basic speed. The basic speed may be either a given fixed speed or may be a function of the speed of inducts 120a, 120b. The speed of inducts 120a, 120b may be determined by measuring the speed of inducts 120a, 120b, such as described in sequence 242. Alternatively, the speed of inducts 120a, 120b may be determined by monitoring data produced by an induct controller. If a fixed speed is chosen, it may be arbitrarily chosen at between 90 percent and 100 percent of top speed. As described in detail in sequence 242, the speed of the most-upstream servo-belt of each induct is continuously determined by monitoring the eight speed commands, or signals, to the servo drives. The speed commands are composed of three main speeds and 15 ratios of that main speed. The defined speed range is between 0 and 100 percent of top speed.

After the basic speed is determined at 176, activity of the merge assembly is determined at 177. The merge activity may be, for example, the number of slug-building lines that are available to release. The defined activity may be empty or active. The merge is typically considered active when two or more lanes are available for release. A fullness level of upstream accumulator 118a, 118b may be determined at 178 using an array of article sensors spaced along the accumulator or the block time of a sentinel article sensor as previously described. The defined filling levels may be (i) empty, (ii) active, (iii) levels 1-5, and (iv) full.

The fullness levels of downstream accumulators 44 may be determined at 179. These may be determined in a similar fashion to that of accumulators 118a, 118b. The defined levels are (i) empty, (ii) levels 1-5, and (iii) full. Filling-levels 1-5 have corresponding accumulation modifiers that are less than 100 percent. For example, level 1 may have an accumulation modifier of 97.5 percent while level 5 may have an accumulation modifier of 85 percent and the remaining levels are in-between. Similar level modifiers are applied to the levels in determining the fullness of accumulators 118a, 118b.

The merge assembly activity is evaluated at 180. If it is determined that the merge is empty, then the speed of conveyors 16, 116 is set to a reduced speed, such as a 50 percent speed. This reduces noise and energy consumption, but still shows that the system is operating. If it is determined at 180 that the merge is active, then no action is taken. Alternatively, the speed of sorter 13 may be operated at a reduced speed if it is determined that the merge is empty.

The fullness of upstream 118a, 118b is evaluated at 182. If it is determined that the accumulator is full, the speed of the conveyors 116 is set to 0 at 183. If the fullness parameter indicates that the accumulator is empty, the speed of conveyors 116 is set to 100 percent at 184. If the state is "active," the fullness parameter is set to 100 percent at 185. If an intermediate of accumulation is determined, the fullness parameter is set at less than 100 percent at 186.

The fullness of the downstream accumulator 44 is then evaluated at 187. If the downstream accumulators are full, the speed of conveyors 116 is set to 0 at 188. If the downstream accumulator is empty, the fullness parameter is set to 100 percent at 189. If there is an intermediate level of fullness, the fullness level is set at less than 100 percent at 190.

The speed to be used for conveyors 116 is calculated at 191 as follows. The basic speed of the inducts, whether a given speed or a monitored speed, is multiplied by the fullness parameter of upstream accumulators 118a, 118b, which is multiplied by the fullness level of downstream accumulators 44. Rather than a multiplication algorithm, a subtraction algorithm may be used in considering the upstream modifier and the downstream modifier. The speed calculated at 191 is then evaluated to ensure that it is within a suitable defined speed range, such as between 0 and 100 percent of top speed at 192. The speed value is then sent to the variable frequency drives, or servo-motors, of conveyors 116 at 193.

Thus, it is seen that the fullness parameter is a state parameter. This parameter may be incremented or decremented. For example, where an accumulator is used, the fullness parameter may be incremented as long as the accumulation zones fill in sequence and may be decremented as long as the zones decrease in sequence. The purpose of the monitoring of the sequence of filling and/or emptying of the accumulator is in order to accommodate situations where the accumulator is partially filled but voids exist between partially filled portions of the accumulator. For example, even if zone 7 is full, zones 4 and 5 may be empty. This is treated as if zone 7 was not filled. Likewise, if zones 1-3 are emptied out, the speed of conveyor 16 will not be increased until all of the zones are emptied out. Where an accumulator is not used, the fullness parameter can be incremented or decremented based upon, for example, gapping error detected at the induct.

Other control techniques may be utilized for determining the fullness parameter, such as performing logic operators on the output of an article sensor by using timers in order to determine whether a particular article sensor senses or does not sense an article for a particular period of time, or the like. Other variations may be apparent to the skilled artisan.

Sortation system 10, 110 maintains a balance between a supply of articles by supply system 14, 114 and the rate at which the articles are sorted by sorter 13, 113a, 113b. In one embodiment, this may be accomplished by monitoring the fullness of articles on accumulator 18, 118a, 118b. This provides a natural closed loop feedback system without the necessity of monitoring average length of articles being applied to sorter 13, 113a, 113b or other such schemes. Also, it provides for the insertion of an unscrambler either upstream of or downstream of merge 24. Unscramblers remove side-by-side articles and thereby increase the overall line length of articles when the articles are put in single file. This may readily be accomplished by sortation system 10, 110 because such increase in line length may result in accumulation of articles at accumulator 18, 118a, 118b thereby resulting in a decrease in speed of the conveyors of supply system 14. Also, should an article jam condition exist somewhere in sorter assembly 12, 112a, 112b, the resulting backup of articles on accumulator 18, 118a, 118b will result in a rapid but graceful decrease in speeds of conveyors 16, 116 rather than an abrupt shutdown of the conveyors.

Control system 15, 115 may be programmed to decrease the speed of conveyors 16, 116 when the system is empty. This may be determined, for example, by determining that no cartons are available to be discharged from the supply accumulator lines 22. This reduces energy consumption and noise produced by sortation system 10, 110 while still allowing the conveyors to run but at a lesser speed. This assures the operator that the conveyor system is operational but just not in use. Additionally, the speed of the sorter assembly may be reduced in the absence of cartons, or product, to sort.

Thus, it is seen that the present invention is capable of assuring an adequate supply of articles to sorter 13, 113*a*, 113*b* and the shipping sorters without the requirement of extensive lengths accumulation upstream of the respective sorter. Also, because conveyor 16, 116 and/or sorter 13, 113*a* and 113*b* can be reduced in speed in increments rather than abruptly shut down upon excessive article backup, they can be operated at a higher speed.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A sortation system, comprising:
a sorter assembly, said sorter assembly receiving product and sorting that product to a plurality of sortation lines;
a supply system made up of a plurality of conveyors and a merge assembly, wherein said merge assembly supplies product to said conveyors and said conveyors supply product to said sorter assembly; and
a control system, said control system monitoring product supplied to the sorter assembly and determining a parameter, said parameter indicative of an excess of product supplied to said sorter assembly with respect to product being sorted by said sorter assembly;
said control system controlling a speed of said conveyors as a function of a value of the parameter in order to maintain a balance between a rate of supply of product by said supply system and a rate at which product are sorted by said sorter assembly by reducing the speed of said conveyors in response to an increase in said parameter and by increasing the speed of said conveyors in response to a decrease in said parameter.

2. The sortation system as claimed in claim 1 wherein said sorter assembly includes an accumulator, said accumulator accumulating an excess of product supplied to said sorter assembly than product being sorted by said sorter assembly, wherein said control system monitors product accumulated at said accumulator and determines a value of said parameter as a function of the product accumulated at said accumulator.

3. The sortation system as claimed in claim 2 including a plurality of product detectors spaced along said accumulator, said control system determining a value of said parameter as a function of which of said product detectors are detecting product.

4. The sortation system as claimed in claim 3 wherein said control system controls operation of said accumulator to accumulate product as a function of which of said product detectors are detecting product.

5. The sortation system as claimed in claim 3 wherein said control system modifies the value of said parameter in response to particular ones of said product sensors detecting product in a sequential order.

6. The sortation system as claimed in claim 5 wherein said control system modifies the value of said parameter in response to said particular ones of said product sensors not detecting product in a decreasing sequential order.

7. The sortation system as claimed in claim 2 including at least one product detector at said accumulator, said control system determining a value of said parameter as a function of an amount of time, said at least one product detector is detecting product.

8. The sortation system as claimed in claim 2 including another accumulator, said another accumulator being downstream of said accumulator in a direction of product flow, said control monitoring product accumulated at said another accumulator and determines a value of said parameter as a function of the product accumulated at said another accumulator.

9. A sortation system, comprising:
a sorter assembly, said sorter assembly receiving product and sorting that product to a plurality of sortation lines;
a supply system made up of a plurality of conveyors, said supply system supplying product that is received by said sorter assembly; and
a control system, said control system monitoring product supplied to the sorter assembly and determining a parameter, said parameter indicative of an excess of product supplied to said sorter assembly with respect to product being sorted by said sorter assembly;
said control system controlling said supply system as a function of a value of the parameter by decreasing the supply of product supplied by said supply system in response to an increase in said parameter and by increasing the supply of product supplied by said supply system in response to a decrease in said parameter; and
wherein said sorter assembly includes a product induct, said product induct adjusting an actual product gap between product being sorted by said sorter assembly wherein said control system determines a value of said parameter as a function of operation of said product induct.

10. The sortation system as claimed in claim 9 wherein said control system determines a value of said parameter as a function of a difference between the actual product gap and an ideal product gap.

11. The sortation system as claimed in claim 9 wherein said supply system comprises a plurality of feed lines and a merge assembly, each of said supply feed lines selectively discharging product to said merge assembly and said merge assembly supplying product to said conveyors.

12. The sortation system as claimed in claim 11 wherein said feed lines comprise slug-building lines and wherein each of said slug-building lines combine individual product into product slugs.

13. The sortation system as claimed in claim 11 wherein said control system controls a speed of said merge assembly as a function of the value of said parameter.

14. The sortation system as claimed in claim 1 wherein said control system includes a position transducer, said position transducer monitoring movement of product on said conveyors.

15. The sortation system as claimed in claim 1 wherein said conveyors are driven by at least one chosen from variable frequency motors and servo controlled motors.

16. The sortation system as claimed in claim 1 wherein said control system determines the value of said parameter from at least one chosen from an algorithm and a look-up table.

17. A sortation system, comprising:
a sorter, said sorter receiving product and sorting that product to a plurality of sortation lines;
an accumulator supplying product to said sorter, said accumulator accumulating an excess of product supplied to said accumulator with respect to product supplied to said sorter;

a supply system made up of a plurality of conveyors, said supply system supplying product to said accumulator; and a control system, said control system monitoring product accumulated with said accumulator and adjusting a rate of product supplied with said supply system as a function of fullness of said accumulator with product, wherein said control system decreases the supply of product supplied with said supply system in response to an increase in the fullness of said accumulator and increases the supply of product supplied with said supply system in response to a decrease in the fullness of said accumulator.

18. A method of sorting product comprising:

providing a sorter assembly, receiving product with said sorter assembly and sorting that product to a plurality of sortation lines;

providing a supply system made up of a plurality of conveyors and a merge assembly, and supplying product from said merge assembly to said conveyors and from said conveyors to said sorter assembly; and monitoring product supplied to the sorter assembly and determining a parameter, said parameter indicative of an excess of product supplied to said sorter assembly with respect to product being sorted by said sorter assembly; and controlling a speed of said conveyors as a function of a value of said parameter in order to maintain a balance between a rate of supply of articles by said supply system and a rate at which articles are sorted by said sorter assembly by reducing the speed of said conveyors in response to an increase in said parameter and by increasing the speed of said conveyors in response to a decrease in said parameter.

19. A method of sorting product comprising:

providing a sorter, receiving product with said sorter and sorting that product to a plurality of sortation lines;

providing an accumulator supplying product to said sorter, accumulating with said accumulator an excess of product supplied to said accumulator with respect to product supplied to said sorter;

providing a supply system made up of a plurality of conveyors, supplying product with said supply system to said accumulator; and monitoring product accumulated with said accumulator and adjusting a rate of product supplied with said supply system as a function of fullness of said accumulator with product including decreasing the supply of product supplied with said supply system in response to an increase in fullness of said accumulator and increasing the supply of product supplied with said supply system in response to a decrease in fullness of said accumulator.

20. The sortation system as claimed in claim 9 wherein said control system determines a value of said parameter as a function of a speed of said product induct.

* * * * *